Patented Apr. 24, 1945

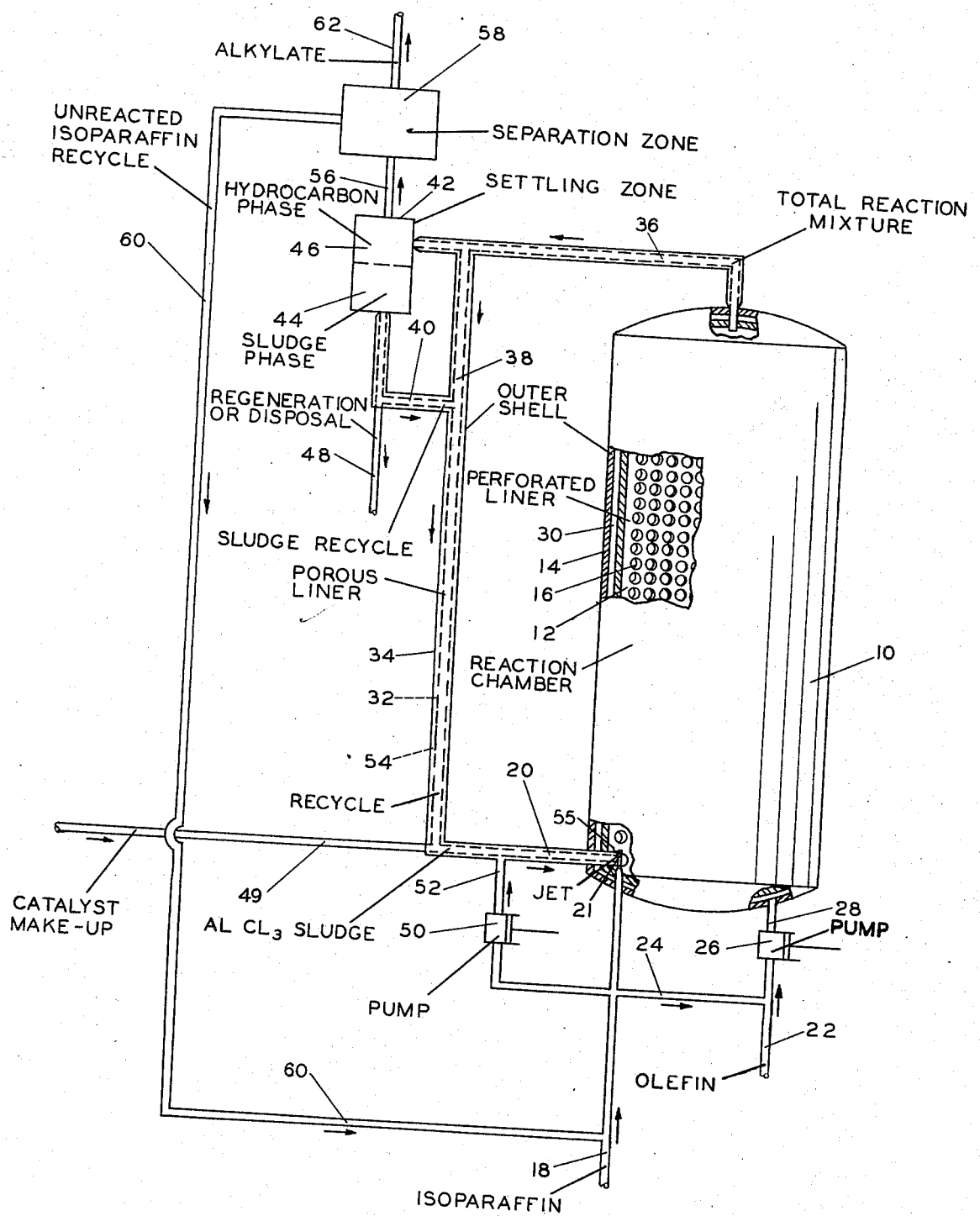

2,374,511

UNITED STATES PATENT OFFICE 2,374,511

PROCESS FOR EFFECTING CATALYTIC REACTIONS

John D. Upham, Bartlesville, Okla., assignor to Phillips Petroleum Company, a corporation of Delaware Application April 9, 1943, Serial No. 482,438

9 Claims. (Cl. 260—683.4)

This invention relates to a process and apparatus wherein material, such as a catalyst, is moved under conditions normally tending to cause corrosion and/or erosion of the apparatus. A specific modification involves the prevention of corrosion and/or erosion of the walls of reaction chamber, conduits or other portions of an apparatus wherein a mobile corrosive catalyst is employed.

In catalytic conversions utilizing solid, liquid, or gaseous catalysts in which the catalyst is suspended, dispersed, or dissolved in a stream of reactant fluids, or otherwise caused to move through the apparatus, the catalyst utilized frequently causes corrosive and/or erosive effects due to either chemical or physical properties of the catalyst, or both, emphasized by the fluent conditions of use. These features are influenced by others such as stream velocities, turbulent flow, operating temperatures, and the like. The corrosive and erosive effects are particularly noticeable in the presence of solid suspended catalyst utilized in either gaseous or liquid phase reactants, and especially so where the catalyst itself, the reactants, promotors, and/or products of reaction have a tendency to chemically attack walls of the reaction vessels and other equipment.

The invention has particular utility in hydrocarbon conversions where such problems are frequently encountered, and a preferred embodiment of the invention will be described with specific reference to hydrocarbon conversions effected with a particular type of catalyst, namely a sludge or slurry of aluminum chloride, usually promoted with minor amounts of hydrogen chloride. However, it will be seen that the principles of the invention may be applied to other processes and/or apparatus wherein similar problems are involved and the necessary modifications will readily be made by one skilled in the art in view of the detailed disclosure herein.

The use of aluminum chloride and other active metal halides of the Friedel-Crafts type as catalysts for many reactions involving organic compounds is well known. Important among the hydrocarbon conversions of commercial interest at the present time in which these catalysts are used, may be mentioned isomerization of saturated hydrocarbons, and alkylation of hydrocarbons with alkylating reactants such as olefins, alcohols, alkyl halides, etc. It has been found that aluminum chloride and like sludge, which may or may not contain a free metal halide in solution or suspension, is very corrosive and erosive to most metals and other materials of construction, particularly when in motion. Isomerization and alkylation reactions are now carried out in which such sludge is circulated or otherwise moved through the apparatus either along with or counter-current to reactants, and the corrosion problem has proved to be very serious. Even in the absence of solid material, corrosive effects occur and these are influenced by currents or streams of catalyst and reaction mixture being treated, as well as by the inherently corrosive nature of the catalytic materials. It has, in fact, been found that even when such motion is very slow, as for example when a slow dripping of sludge occurs into the bottom of a catalyst chamber in which solid aluminum chloride is disposed in a bed, a severe corrosion may occur causing premature failure of equipment. When hydrogen chloride is used as activator the corrosion problem is aggravated. To a certain extent similar problems are found in systems utilizing boron trifluoride, hydrogen fluoride, sulfuric acid, and other very active fluid catalytic materials. The present invention serves to mitigate or avoid the problems referred to as will be seen more clearly hereinafter.

Another type of catalytic conversion to which my invention may be applied with advantage involves the use of solid catalyst in finely divided or powdered form suspended in hot gases. Such conversions are typified by the process known as "fluid" catalytic cracking in which a hydrocarbon vapor carrying suspended catalyst powder, such as synthetic silica-alumina, acid-treated clays, or the like, is flowed through a conversion zone at cracking temperatures, say 800 to 1150° F., catalyst is separated from products, and the catalyst powder is regenerated by passage through a regeneration zone while suspended in hot oxygen-containing gases. In conventional practice, a certain amount of erosion occurs in both the regeneration and reaction zones as well as in conduits carrying the solid catalyst particles.

In addition to solving the aforementioned problems, my invention may, in certain instances, at the same time serve to provide for controlled addition of reactants to the reaction zone, and may also provide a mode of operation in which control of reaction temperatures is readily effected.

It is an object of this invention to provide improved apparatus and process wherein erosion and/or corrosion by moving material is minimized. Another object is to provide apparatus suitable for effecting hydrocarbon conversions utilizing a mobile catalyst. A further object is to provide apparatus particularly suited for alkylation, isomerization, or other processes utilizing catalytically active sludges or other fluent catalyst compositions comprising aluminum chloride or other active halides. Still another object is to provide a reaction chamber and/or conduit resistant to the corrosive effects of such catalyst compositions. A further object is to provide improvements in so-called "fluid" catalyst systems wherein erosion caused by hard catalyst particles moving through the system is minimized. Yet another object is to provide for the control of temperature, concentration of reactants, and other reaction conditions in catalytic systems of the type described. Other objects and advantages of my invention will be apparent from the accompanying disclosure and discussion.

Briefly, the foregoing purposes and objects of the invention may be realized through a novel construction which permits the substantially continuous maintenance of a protective fluid sheet or film against which the corrosive or erosive material in question must impinge. In a preferred form, a reaction chamber, conduit, or other portion of the apparatus comprises an inner perforated or porous liner, disposed within an outer wall, an annular space between the liner and wall being thus formed. Reactants and catalyst are introduced into and passed through the inner permeable lining in any desired manner, while a portion of the reactants, or recycled product, or diluent material, or any mixture thereof is forced into said annular space in a fluid condition under such a pressure that flow thereof occurs through the perforations or pores into the chamber or conduit carrying the moving catalyst. Thus a blanket of noncorrosive fluid of little or no catalyst content is continuously maintained adjacent the inner walls, preventing or restraining contact of erosive or corrosive material with chamber walls.

It is a feature of my invention that the protective fluids so introduced are relatively non-corrosive and preferably comprise a normal component of the reaction mixture, thus avoiding any unnecessary dilution of products or introduction of extraneous material. However, in some cases, such as those in which a diluent serves other useful functions in the reaction mixture, or in which the character of the reaction mixture is such that a protective film of peculiar properties is required, the material used to form said film may be one which would normally not be introduced into the process. For example, a gaseous diluent such as steam may be introduced through a permeable liner of a reaction chamber in a fluid catalytic cracking system to serve the dual function of minimizing erosion and supplying heat to the endothermic cracking. As another example, a heavy lubricating oil, soap, grease, wax, or like viscous material may be forced through the inner wall to provide the protective coating in cases where such viscous material is found to be required for optimum protection and is innocuous in the system. Accordingly by the term "fluid" I mean to include viscous materials which are flowable through the openings.

In liquid-phase operations I generally prefer to provide a liquid protective film in the practice of my invention. However, the film may upon occasion be gaseous, as when a gas or readily vaporizable liquid is forced through the liner and where the construction of the apparatus is such that a gas film of sufficient continuity may be readily maintained, as for example in vertical conduits or the like. In the case of gas-phase operations a gas is normally forced through the permeable liner in carrying out the purposes of the invention, although the use of a liquid in such situation is not precluded and may in fact in some instances be found desirable.

As an additional feature, the control of temperature in exothermic or endothermic conversions may frequently be effected by introduction of suitably cooled or heated fluid into the annular space between outer wall and inner liner, with subsequent flow thereof into the reaction chamber proper. Particularly desirable in the case of exothermic alkylation and isomerization reactions is the use of a liquified hydrocarbon material which is normally gaseous at reaction conditions, since a relatively large amount of heat is absorbed through the vaporization of said hydrocarbon and an active, rapidly expending protective film of gas is continuously generated on the inner surface of the reaction chamber.

In the catalytic reaction of alkylatable hydrocarbons, particularly paraffins, with olefins it is very important that the concentration of olefins at all points in the reaction mixture be maintained at low value, ordinarily not exceeding 10 mol per cent of the total hydrocarbons present at such a point, and frequently being maintained below 1 mol per cent. A specific modification of this invention as used in such a catalytic alkylation involves maintaining a rapidly circulating mixture of hydrocarbons and fluid alkylation catalyst within a reaction zone constructed in accordance with the principles set forth herein, and introduction of the olefin reactant, preferably mixed with some of the hydrocarbon being alkylated, into the annular space and thence into the reaction chamber, thus providing the desired protective fluid blanket and at the same time a carefully controlled addition of olefins to the reaction mixture under such conditions that they become rapidly dispersed therein. In this way, optimum ratios of alkylatable hydrocarbon to olefin are readily maintained.

The accompanying drawing shows diagrammatically in partially cut away view a preferred form of apparatus which may be utilized in carrying out such an alkylation process as just described, using ethylene and isobutane as reactants, and the drawing and accompanying description will further serve to exemplify the invention.

Reaction chamber 10 is made up from an inner perforated liner 12 and an other pressure-resistant shell 14. Perforations 16 are indicated diagrammatically much larger than the actual size in practice for the sake of clarity in the drawing. A convenient manner of fabricating such a lining is to first manufacture the same in the form of an imperforate structure and then to punch or drill holes of the requisite number and size therein. Of course other methods of manufacture may be used. A reactant liquid, in this case isobutane, is introduced to the system through conduit 18 under pressure, while the aluminum chloride sludge which is used as catalyst is introduced through conduit 20. In the modification shown, these two conduits join in a Venturi-type jet 21 so that the isobutane enters the reaction zone at high velocity carrying with it the catalytic sludge. The jet is preferably so located and directed in the reaction chamber that a vigorous agitation and circulatory motion of the contents thereof is set up and maintained. Of course, agitating and circulating means in addition to or other than jet 21 may be provided, but are generally not so satisfactory, usually introducing mechanical difficulties. The isobutane stream is added at or below reaction temperature as required.

Ethylene, either alone or dissolved in other hydrocarbons, enters the system through line 22, is joined via line 24 by some isobutane from line 18, and forced by pump 26 through conduit 28 into annular space 30 between jacket 14 and liner 12 under a pressure substantially higher than that prevailing in the reaction zone. Preferably this stream is at a temperature well below alkylation temperature and this condition is readily realized in many systems of ethylene purification wherein low-temperature fractionation is used. The ethylene-containing liquid passes continuously from zone 30 through the perforations 16 and into the interior of reaction chamber 10 where it forms a substantially continuous fluid film on the inner wall of liner 12. Ethylene from this film continuously becomes admixed with the circulating mixture of hydrocarbons and catalyst and reacts with the isobutane to form high yields of six-carbon-atom paraffins, principally di-isopropyl. It will be seen that the concentration of free ethylene in the reaction mixture may readily be maintained at as low a value as is desired. In the case of more reactive olefins such as isobutylene and the like, the olefin concentration must be kept even lower than that used in the system just described, due to the increased tendency of such olefins to polymerize, and the advantages of this type of olefin addition will be readily apparent. The factors of pressure differential across perforations 16, size and number of perforations 16, temperature and viscosity of the ethylene-containing stream, and the various reaction conditions are correlated so as to give the requisite protective effect along with the proper rate of olefin addition. Introduction of a cold ethylene stream in this manner serves not only to remove heat of reaction, but also to give greater protection due to the maintenance of liner 12 at a low temperature, and pre-reaction of the olefin is minimized. Aluminum chloride is slightly soluble in liquid hydrocarbons, and the protective film provided as described is substantially free from dissolved, as well as suspended, aluminum chloride.

Conduits in the system which carry sludge are constructed of a perforated or porous tube 32 surrounded by an outer tube 34 as will be described. Such conduits are 20, 36, 38, and 40. A portion of the total reaction mixture is continuously withdrawn through conduit 36 and passed to settling zone 42 wherein a lower sludge phase 44 and an upper hydrocarbon phase 46 are separated. Part of the total reaction mixture in conduit 36, may, if desired, be recycled to the chamber via conduits 38 and 20. Sludge is passed from settling zone 42 back to the reaction chamber via conduits 40, 38, and 20. A portion of this sludge is usually withdrawn, as by conduit 48, to disposal or regeneration, while make-up aluminum chloride is provided through conduit 49. As shown in the drawing, isobutane from line 18 is forced by pump 50 through line 52 into annular space 54 between porous liner 32 and outer tube 34. When liner 32 is made of porous ceramic ware while liner 12 is of perforated metal, the pressure in zone 54 is generally maintained appreciably higher than the pressure in zone 30. Furthermore, it would be undesirable to introduce any olefin into these conduits. Accordingly, the apparatus is so constructed that the two zones carrying protective fluid are maintained separate. In other instances, it may be preferred that they be continuous. Sufficient isobutane is continuously forced into the interior of the conduits 20, 36, 38, and 40 to protect the same against corrosion and erosion caused by sludge moving therethrough by the maintenance of a film of liquid isobutane. This isobutane, being a normal component of the reaction mixture, is in no way undesirable, and upon passing into the reaction zone 10 it enters into the alkylation reaction.

As shown in the drawing, the outer tube 34 extends around jet 21 in the reaction chamber in order to protect conduit 20 up to the jet from internal corrosion, and to protect the jet from internal and external corrosion. This portion of the tube 34, designated by reference numeral 55, may itself be perforated or porous to provide protection against corrosion by the circulating contents of the reaction chamber. Preferably the jet is not exposed in the reaction chamber except at its outlet.

Material is passed from hydrocarbon phase 46 in settling zone 42 through conduit 56 to a separation zone indicated diagrammatically at 58. In zone 58, which usually comprises one or more fractionating columns and auxiliary equipment, unreacted isobutane is separated and recycled to line 18 via conduit 60, while the alkylate is removed from the system via line 62.

While the above description has been directed primarily to a specific apparatus suited particularly to an alkylation process catalyzed by aluminous chloride, the modifications of the apparatus and process so described which are required for adapting the same to other processes as indicated hereinbefore will readily be supplied by one skilled in the art. As used in the appended claims the term "corrosion" and related words refer to corrosion by either chemical action or mechanical wearing away, as by erosion, or both.

I claim:

1. A method for the conversion of hydrocarbons in the presence of a moving corrosive catalyst which comprises subjecting said hydrocarbons to conversion conditions in the presence of said moving catalyst within a reaction zone bounded by corrodible permeable walls, and continuously passing into said reaction zone through said permeable walls a non-corrosive fluid which forms a protective fluid barrier between said walls and said catalyst, whereby corrosion of said walls is substantially prevented.

2. A method as defined in claim 1 in which said non-corrosive fluid is a normal component of the reaction mixture.

3. A method as defined in claim 1 in which said non-corrosive fluid comprises a portion of said hydrocarbons to be converted.

4. A method as defined in claim 1 in which said non-corrosive fluid further acts to control reaction temperature by direct heat exchange with the reaction mixture.

5. A method as defined in claim 1 in which finely divided solid cracking catalyst is suspended in vaporized hydrocarbons and the resulting suspension passed through said reaction zone under cracking conditions.

6. A process for the synthesis of hydrocarbons which comprises passing a stream of alkylatable hydrocarbons through a reaction chamber having permeable walls, passing a stream of corrosive mobile alkylation catalyst through said reaction chamber in intimate contact with said hydrocarbons, introducing into said reaction chamber through said permeable walls a non-corrosive hydrocarbon fluid comprising olefins, maintaining alkylation conditions within said chamber to effect reaction of said alkylatable hydrocarbons with said olefins, and introducing said olefins at such rate so as to avoid undesirably high concentrations of olefins in the reaction mixture and so as to interpose a relatively catalyst-free barrier between the catalyst-hydrocarbon mixture and the walls of the reaction chamber.

7. A process as defined in claim 6 in which said catalyst comprises aluminum chloride, said alkylatable hydrocarbon is isobutane, said olefin is ethylene, and said fluid comprising olefins serves to remove heat of reaction.

8. In a process wherein a corrosive liquid stream passes through a passageway bounded by a corrodible porous material, the improvement which comprises forcing through the pores of said material into said passageway a non-corrosive liquid which vaporizes upon the inner surface thereof, thereby maintaining a substantially continuous expanding protective film of gas between said surface and said liquid stream.

9. A process for the synthesis of hydrocarbons which comprises passing a liquid stream of isoparaffin through a reaction chamber having permeable walls, passing a stream of corrosive mobile aluminum chloride alkylation catalyst through said reaction chamber in intimate contact with hydrocarbons therein, withdrawing from said reaction chamber reaction mixture comprising such catalyst and returning at least a portion of so-withdrawn catalyst to said reaction chamber through a passageway having permeable walls, introducing into said passageway through said permeable walls for flow into said reaction chamber a non-corrosive olefin-free liquid comprising isoparaffin at such rate so as to interpose a relatively catalyst-free barrier between the catalyst and walls, introducing into said reaction chamber through said permeable walls a non-corrosive hydrocarbon fluid comprising olefin and isoparaffin at a temperature below reaction temperature, maintaining alkylation conditions within said chamber to effect reaction of said isoparaffin with said olefin, and introducing said fluid comprising olefin and isoparaffin at such rate so as to avoid undesirably high concentrations of olefin in the reaction mixture and so as to interpose a relatively catalyst-free barrier between the catalyst-hydrocarbon mixture and the walls of the reaction chamber.

JOHN D. UPHAM.

Disclaimer 2,374,511.—*John D. Upham*, Bartlesville, Okla. PROCESS FOR EFFECTING CATALYTIC REACTIONS. Patent dated Apr. 24, 1945. Disclaimer filed Apr. 26, 1948, by the assignee, *Phillips Petroleum Company*.

Hereby enters this disclaimer to so much of claims 6 and 7 of said patent as is in excess of the following:

6. A process for the synthesis of hydrocarbons which comprises passing a stream of alkylatable hydrocarbons through a reaction chamber having corrodible permeable walls, passing a stream of corrosive mobile alkylation catalyst through said reaction chamber in intimate contact with said hydrocarbons, introducing into said reaction chamber through said permeable walls a non-corrosive hydrocarbon fluid comprising olefins, maintaining alkylation conditions within said chamber to effect reaction of said alkylatable hydrocarbons with said olefins, and introducing said olefins at such rate so as to avoid undesirably high concentrations of olefins in the reaction mixture and so as to interpose a relatively catalyst-free barrier between the catalyst-hydrocarbon mixture and the walls of the reaction chamber.

7. A process as defined in claim 6 in which said catalyst comprises aluminum chloride, said alkylatable hydrocarbon is isobutane, said olefin is ethylene, and said fluid comprising olefins serves to remove heat of reaction.

[*Official Gazette May 25, 1948.*]